(12) United States Patent
Notagashira

(10) Patent No.: US 6,828,956 B2
(45) Date of Patent: Dec. 7, 2004

(54) COORDINATE INPUT APPARATUS, COORDINATE INPUT SYSTEM, COORDINATE INPUT METHOD, AND POINTER

(75) Inventor: Hidefumi Notagashira, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 09/766,635

(22) Filed: Jan. 23, 2001

(65) Prior Publication Data

US 2001/0028342 A1 Oct. 11, 2001

(30) Foreign Application Priority Data

Jan. 26, 2000 (JP) ........................................ 2000-017023
Jan. 26, 2000 (JP) ........................................ 2000-017024

(51) Int. Cl.$^7$ ................................................ G09G 5/00
(52) U.S. Cl. ........................................ 345/156; 345/179
(58) Field of Search ................................. 345/179, 156, 345/180, 182, 173, 175, 177; 178/18, 19

(56) References Cited

U.S. PATENT DOCUMENTS

| | | | | |
|---|---|---|---|---|
| 5,317,140 A | * | 5/1994 | Dunthorn .................... | 250/221 |
| 5,341,155 A | * | 8/1994 | Elrod et al. ................. | 345/179 |
| 5,495,269 A | * | 2/1996 | Elrod et al. ................. | 345/179 |
| 5,808,726 A | | 9/1998 | Egawa et al. ............... | 356/3.06 |
| 6,334,699 B1 | * | 1/2002 | Gladnick .................... | 362/268 |
| 6,367,699 B2 | * | 4/2002 | Ackley ...................... | 235/462.49 |
| 6,437,314 B1 | * | 8/2002 | Usuda et al. ................ | 250/221 |

FOREIGN PATENT DOCUMENTS

| | | | |
|---|---|---|---|
| JP | 4-37922 | | 2/1992 |
| JP | 5-233139 | * | 2/1992 |
| JP | 8-233571 | | 9/1996 |

* cited by examiner

*Primary Examiner*—Nitin Patel
(74) *Attorney, Agent, or Firm*—Fitzpatrick, Cella, Harper & Scinto

(57) ABSTRACT

A coordinate input apparatus detects the accurate position of the diffuse light emitted by the light emitting unit of a pointer. The diffuse light emitted from the pointer is collected by a condenser lens, the amount of the diffuse light is detected by a control-signal detecting sensor with a high sensitivity, its output is detected by a frequency detecting unit, and a control-signal detecting unit detects a control signal. The diffuse light emitted from the pointer also passes through a visible-light-cut filter to remove disturbance light, and is received by linear sensors for detecting the direction in which the light comes. The linear sensors are controlled by a sensor control unit. The output signals of the linear sensors are converted by an A-D conversion unit provided for the sensor control unit, sent to a coordinate calculation unit, and the output coordinates on the sensors are calculated.

40 Claims, 18 Drawing Sheets

COORDINATE INPUT APPARATUS, COORDINATE INPUT SYSTEM, COORDINATE INPUT METHOD, AND POINTER

BACKGROUND OF THE INVENTION

1. Field of the Invention

The present invention relates to coordinate input apparatuses, coordinate input systems, coordinate input methods, and pointers.

2. Description of the Related Art

A method has been proposed in which, during a presentation with a computer and a large display system, a speaker standing near a screen directly specifies a point on the screen by a pointer or the like to operate the computer or to modify the image being displayed.

As described in Japanese Unexamined Patent Application Publication No. Hei-4-37922, for example, a system is disclosed in which a speaker standing near a screen on which an image is projected specifies a predetermined portion of the displayed image by a pointer having a light emitting unit at a tip, held by the speaker; a TV camera captures the entire image on the screen, including the light emitting unit; an image processing apparatus discriminates the optical image of the light emitting unit from the projected image to take it out as a positional signal; and a computer is controlled or the projected image is modified according to the positional signal.

In the above-described conventional example, the position of the optical image of the light emitting unit on the screen on which the image is projected or in a projected-video optical path is captured by the video camera to obtain its two-dimensional coordinates.

The system becomes complicated, however, because the scanning method of the projected image needs to be related to that of the captured image to discriminate the optical image of the light emitting unit from the projected image. In addition, the luminance of the optical image of the light emitting unit needs to be sufficiently higher than that of the projected image, which is impossible in terms of energy. When the luminance of the optical image is similar to that of the screen, it is difficult to discriminate the optical image of the light emitting unit from the projected image.

A method is also described in which the screen is illuminated by laser light, the entire image of the screen is captured by a video camera, and the laser light is discriminated from the projected image, but this method has the same problem. Especially if the luminance of the image of the laser light is increased, a safety problem occurs and the use of the laser light is not suited to presentations.

For a presentation with a computer and a large display system, just a usual pointer is used conventionally.

SUMMARY OF THE INVENTION

The present invention has been made in consideration of the foregoing conditions. Accordingly, it is an object of the present invention to provide a coordinate input apparatus, a coordinate input system, a coordinate input method, and a pointer which allow simple and safe detection of the point specified by the user on a screen for computer manipulation and displayed-image modification.

The foregoing object is achieved in one aspect of the present invention through the provision of a coordinate input apparatus including detecting means for detecting diffuse light; light-collecting means for collecting diffuse light emitted in a projection optical path; and generating means for generating positional information on a projection plane from the light collected by the light-collecting means.

The foregoing object is achieved in another aspect of the present invention through the provision of a coordinate input system including projection means for projecting an image; light emitting means for emitting diffuse light having a predetermined wavelength; detecting means for detecting the diffuse light emitted by the light emitting means; light-collecting means for collecting diffuse light emitted in the projection optical path of the projection means; and generating means for generating positional information on a projection plane from the light collected by the light-collecting means.

The foregoing object is achieved in still another aspect of the present invention through the provision of a coordinate input method including the steps of detecting diffuse light; collecting diffuse light emitted in a projection optical path; and generating positional information on a projection plane from the light collected in the light-collecting step.

The foregoing object is achieved in yet another aspect of the present invention through the provision of a coordinate input method including the steps of projecting an image; emitting diffuse light having a predetermined wavelength; detecting the diffuse light emitted in the light emitting step; collecting diffuse light emitted in a projection optical path; and generating positional information on a projection plane from the light collected in the light-collecting step.

The foregoing object is achieved in a still yet another aspect of the present invention through the provision of a coordinate input apparatus including light emitting means for emitting diffuse light; holding means for holding the light emission state of the diffuse light emitted by the light emitting means; light-emission control means for controlling the light emission of the light emitting means; and a grip. The operation section of the light-emission control means is disposed close to the top of the grip, and the holding means is disposed close to the bottom of the grip.

The foregoing object is achieved in a further aspect of the present invention through the provision of a long pointer including a grip section at a first end of an elongated body; and a light emitting section for emitting diffuse light at a second end of the body. The light emitting section emits the diffuse light in a direction different from the longitudinal direction of the pointer.

The foregoing object is achieved in a still further aspect of the present invention through the provision of a long pointer including a grip section at a first end of an elongated body; and a light emitting section for emitting diffuse light at a second end of the body. The portion disposed between the grip section and the light emitting section expands and contracts.

The foregoing object is achieved in a yet further aspect of the present invention through the provision of a storage medium including a program code for a detecting step of detecting diffuse light; a program code for a light-collecting step of collecting diffuse light emitted in a projection optical path; and a program code for a generating step of generating positional information on a projection plane from the light collected in the light-collecting step.

The foregoing object is achieved in a still yet further aspect of the present invention through the provision of a storage medium including a program code for a projection step of projecting an image; a program code for a light emitting step of emitting diffuse light having a predetermined wavelength; a program code for a detecting step of detecting the diffuse light emitted in the light emitting step; a program code for a light-collecting step of collecting diffuse light emitted in a projection optical path; and a program code for a generating step of generating positional information on a projection plane from the light collected in the light-collecting step.

Further objects, features and advantages of the present invention will become apparent from the following description of the preferred embodiment with reference to the attached drawings.

DESCRIPTION OF THE PREFERRED EMBODIMENT

The structure of an optical coordinate input apparatus according to the present invention and the operation of a system using the optical coordinate input apparatus will be described below by referring to FIG. 1 to FIG. 18.

Figure 1:
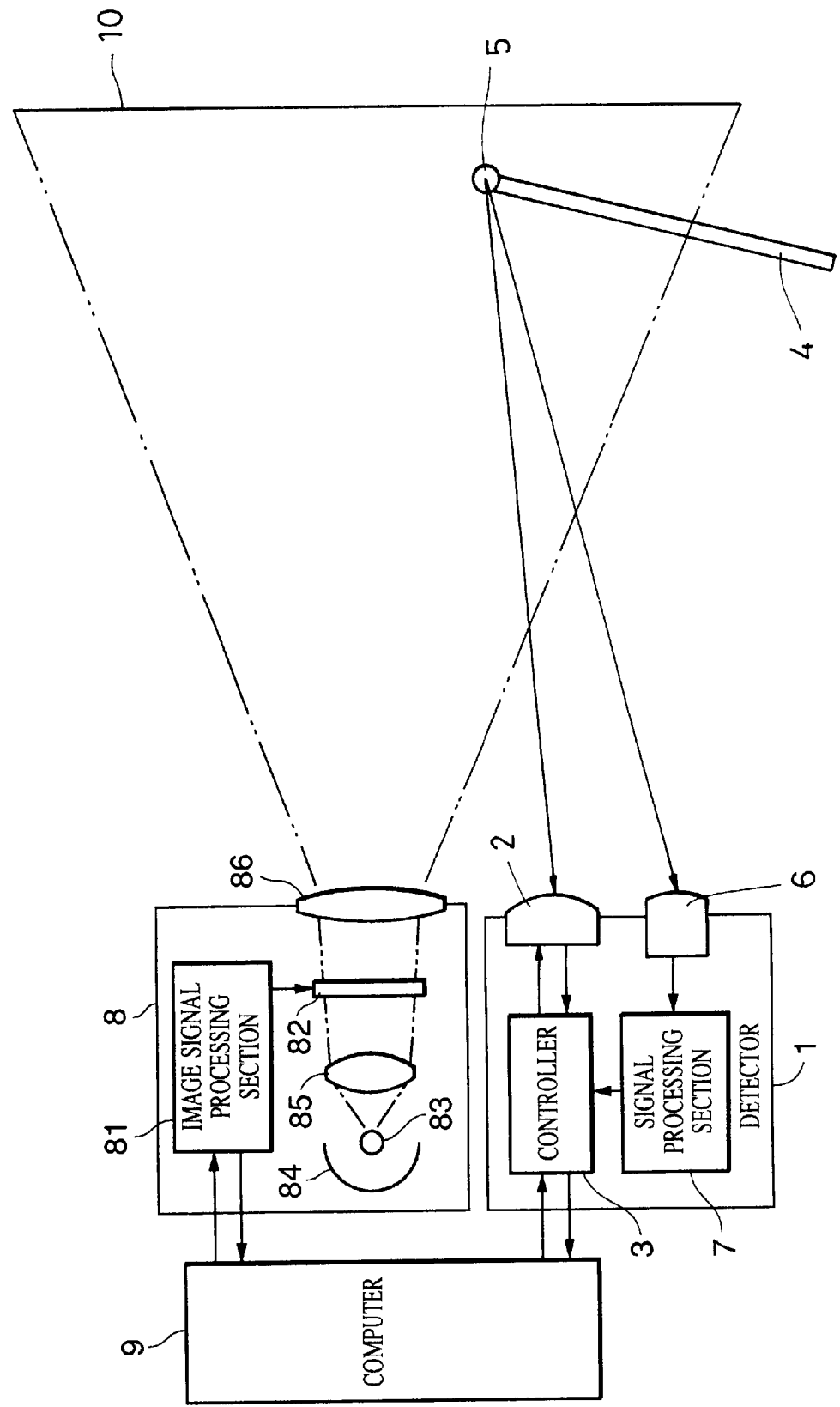
FIG. 1 is a view showing the entire structure of an optical coordinate input apparatus according to an embodiment of the present invention.

FIG. 1 is a plan showing the overall structure in which the optical coordinate input apparatus is used, including a projection-type display apparatus 8 used together with the optical coordinate input apparatus.

The projection-type display apparatus 8 is formed of an image-signal processing section 81 to which an image signal sent from a computer 9 is input, an illumination optical system formed of a liquid-crystal panel 82 controlled by the image-signal processing section 81, a lamp 83, a mirror 84 and a condenser lens 85, and a projection lens 86 for projecting an image on the liquid-crystal panel 82 on a screen 10. This is a well-known structure for displaying a desired image on a large screen. Within the optical path of the light emitted from the projection lens 86 to the screen 10, a light emitting section 5 disposed at a tip of a pointer 4 emits diffuse light toward a detector 1.

The detector 1 is formed of a coordinate detecting sensor section 2, a controller 3 for controlling the coordinate detecting sensor section 2 and for achieving coordinate calculations, a control-signal detecting sensor 6, and a signal processing section 7 thereof. The detector 1 detects the coordinate signal corresponding to the light emitting section 5 on the projection screen and the control signal corresponding to the state of each button provided for the pointer 4, and communicates with the computer 9 by the controller 3. With this structure, the pointer 4 is allowed to write letters or segment drawings on the screen and to perform input operations, such as manipulating buttons and selecting an icon.

Figure 2:
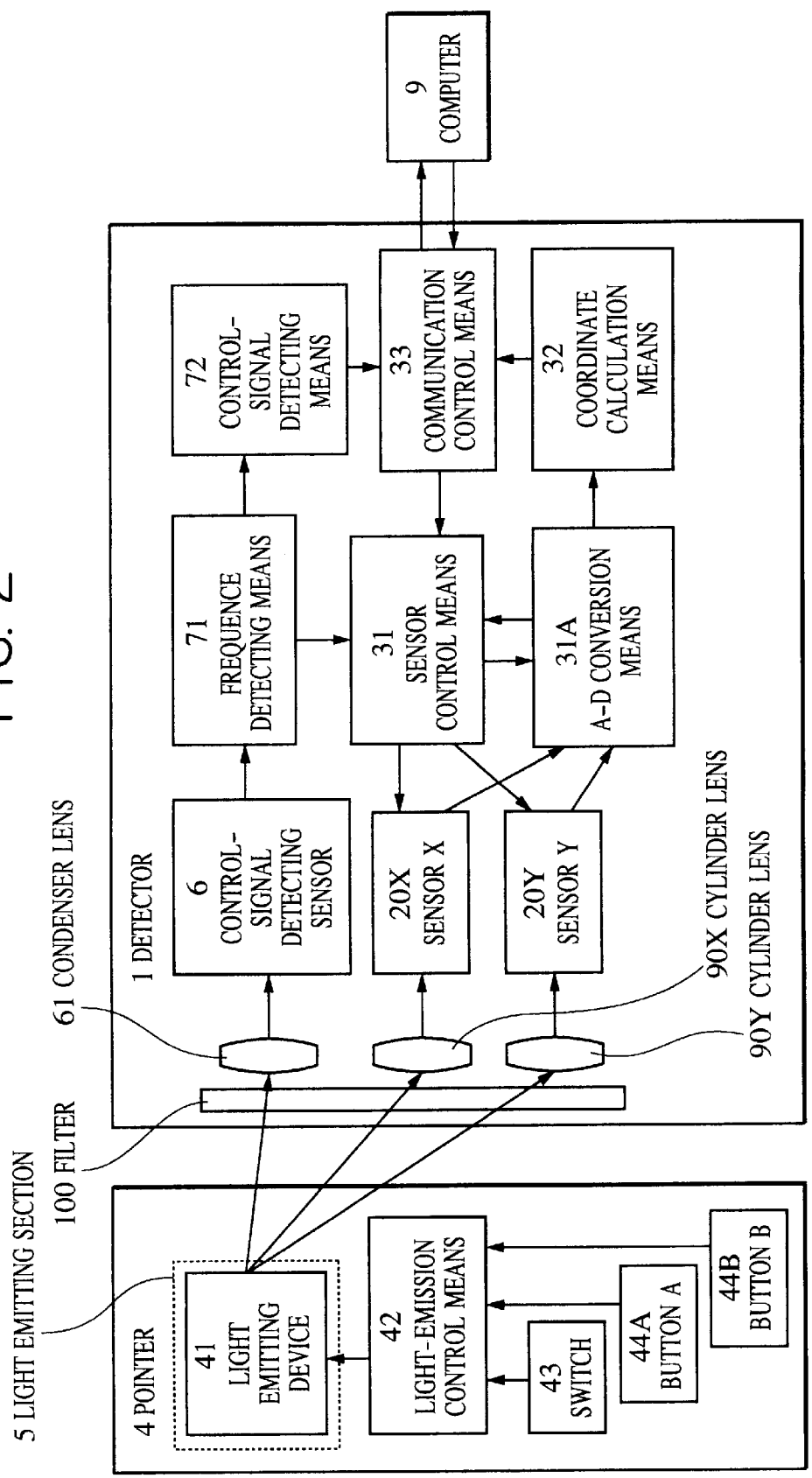
FIG. 2 is a view showing the internal structure of the optical coordinate input apparatus according to the embodiment of the present invention.

FIG. 2 is a view showing the internal structure of the optical coordinate input apparatus. With reference to this figure, the structure of the pointer 4, the structure of the detector 1, and the operation of each section will be sequentially described in detail.

(Description of the Pointer)

The pointer 4 includes the light emitting section 5 which includes a light emitting device 41 serving as a diffuse light source, light-emission control means 42 for controlling the emission of light, a switch 43, and buttons 44A and 44B. The light emitting device 41 is an infrared LED in the present embodiment. The light-emission control means 42 achieves light-emission control of whether light is emitted or not and the superposition of a control signal by using a modulation method described later, according to the states of the switch 43 and the buttons 44A and 44B.

Figure 3:
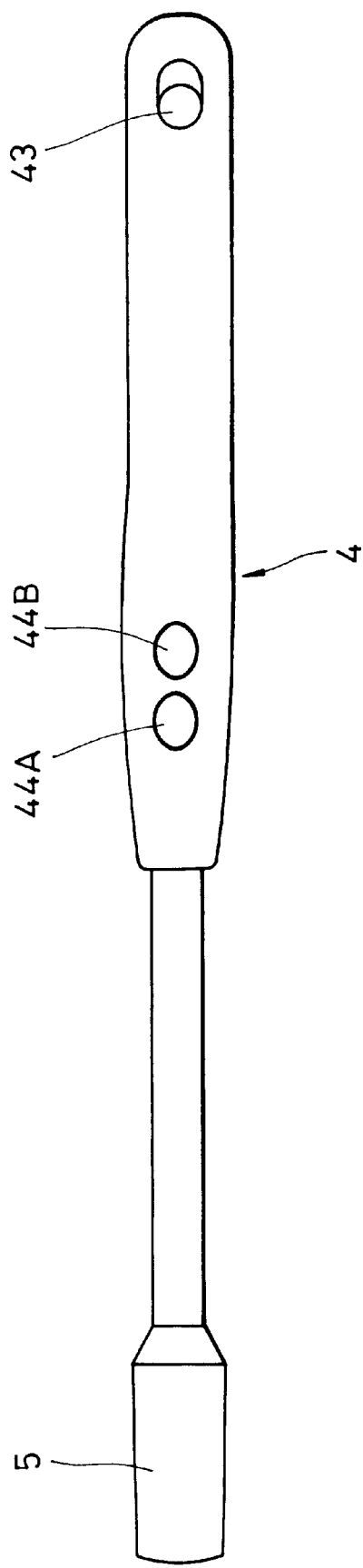
FIG. 3 is an exterior view of a pointer according to the embodiment of the present invention.

FIG. 3 is an exterior view of the pointer 4.

The user sets the switch 43 on to emit light from the light emitting section 5. This diffuse light is detected by the detector 1 and a coordinate signal starts being output by processing, described later. A control signal is in an off state. Therefore, only the specified position is explicitly shown to the user on the screen by the movement of a cursor or the highlighted switching of a button. When a button 44A or 44B is pressed, the control signal assigned to the pressed button is superposed on a light-emission signal. In other words, screen control is achieved, such as inputting letters or segment drawings, by selecting a button. With such a structure, the user specifies a position on the screen quickly and correctly by one hand to write letters or drawings or to select a button or a menu.

In order to use two types of pointers, one for local control and the other for remote control, in order that each of more than two persons uses a pointer, and in order to use a plurality of pointers having different attributes such as colors and thickness, the light-emission control means 42 sends a unique ID number together with a control signal. According to the sent ID number, software installed in an externally connected unit determines the attributes, such as the thickness and color of lines to be drawn. The attribute settings can be changed by a button or a menu on the screen. The pointer 4 may be provided with an operation button to send an attribute change signal. Alternatively, the system may be configured that these attribute settings are held inside the pointer 4 or inside the coordinate detector 1 and not an ID number but attribute information is sent to the externally connected unit. In this case, the pointer 4 or the coordinate detector 1 needs to have a section for holding the settings. It is advantageous, however, that an attribute is switched at once when one pointer is used for two or more apparatuses, and that settings are shared when the screens of a plurality of externally connected apparatuses are shown.

The additional operation button can also be used for other functions, such as blinking of a display apparatus, switching of signal sources, and operations of a recording apparatus.

(Description of the Detector)

Figure 4:
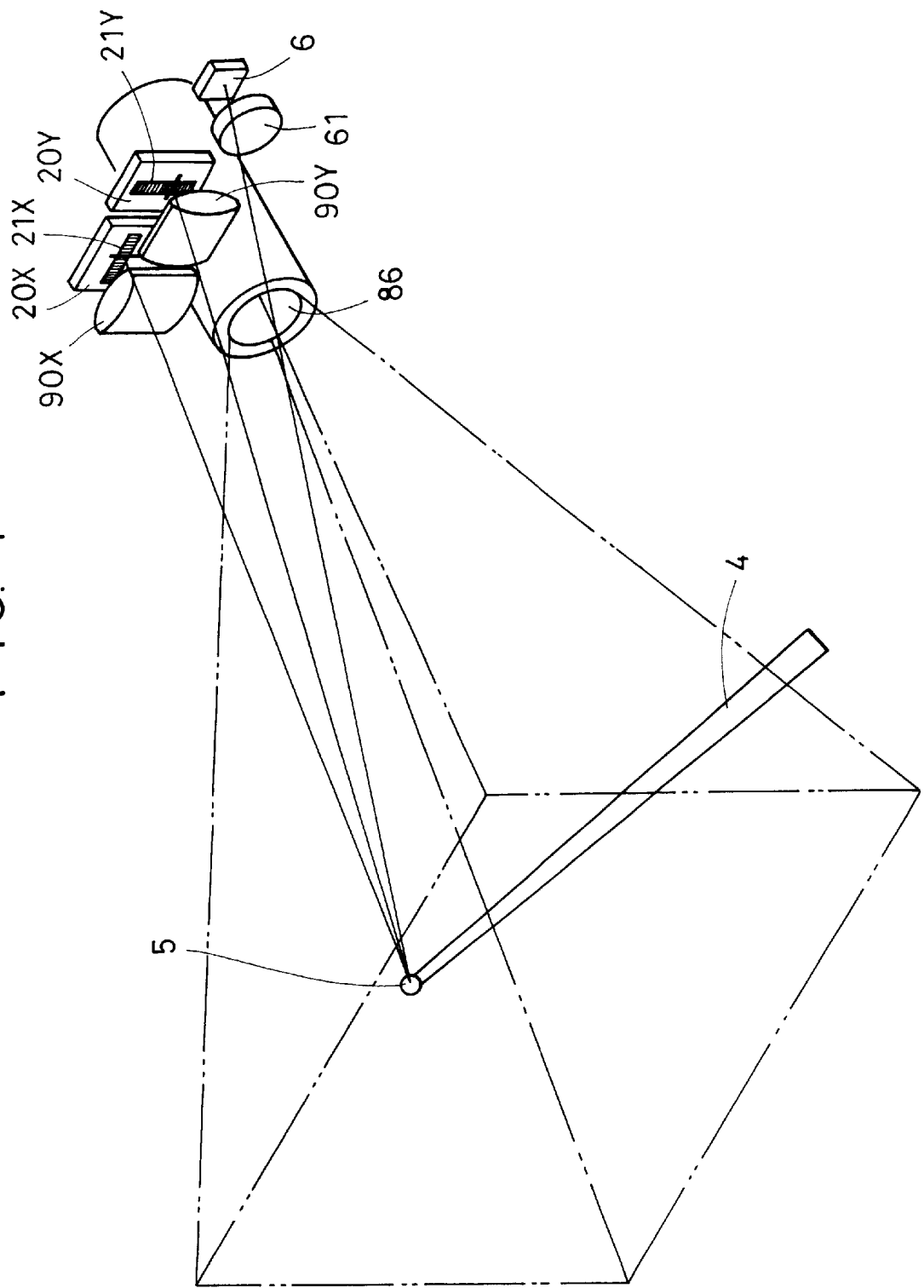
FIG. 4 is a view showing the arrangements of linear sensors and a control-signal detecting sensor according to the embodiment of the present invention.

The detector 1 is provided with the control-signal detecting sensor 6 for detecting the amount of light with a high sensitivity by the use of a condenser lens 61, and two linear sensors 20X and 20Y for detecting the direction in which light comes by the use of cylinder lenses 90X and 90Y. The diffuse light emitted from the light emitting section 5 of the pointer 4 passes through a visible-light-cut filter 100 to remove disturbance light, and is received by the control-signal detecting sensor 6 and by the linear sensors 20X and 20Y. The condenser lens 61, the control-signal detecting sensor 6, the cylinder lenses 90X and 90Y, and the linear sensors 20X and 20Y are disposed as shown in FIG. 4. The control-signal detecting sensor 6 is mounted with the condenser lens 61, and detects the amount of light having a predetermined wavelength sent from all areas on the screen with a high sensitivity. Its output is detected by frequency detecting means 71 to demodulate a digital signal, including data such as a control signal superposed by the light-emission control means 42.

The two linear sensors 20X and 20Y collect the diffuse light emitted from the light emitting section 5 of the pointer 4 by the use of the cylinder lenses 90X and 90Y, and images are formed linearly on photosensitive sections 21X and 21Y of the sensors. As shown in FIG. 4, the two sensors are disposed so that their center lines are exactly perpendicular to each other, and the photosensitive section 21X of the linear sensor 20X for detecting an X coordinate is placed above the optical axis of the projection lens 86, such that the linear sensors 20X and 20Y have peak outputs at the pixels corresponding to the X coordinate and the Y coordinate of the light emitting section 5. These linear sensors are controlled by sensor control means 31. Their output signals are sent to coordinate calculation means 32 by A-D conversion means 31A provided for the sensor control means 31, as digital signals to calculate output coordinates on the sensors.

Figure 5:
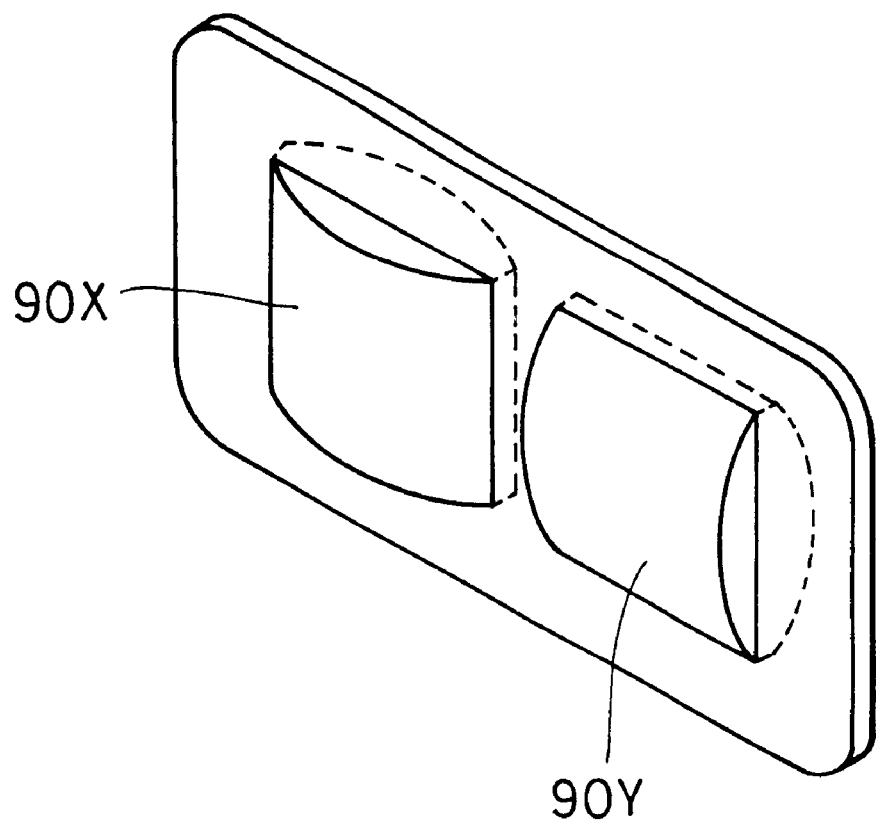
FIG. 5 is a view showing cylinder lenses formed as a unit.

When the cylinder lenses 90X and 90Y are formed as a unit by plastic molding as shown in FIG. 5, the X axis and the Y axis are correctly set.

In addition, space can be saved when the control-signal detecting sensor 6 and the condenser lens 61 are disposed in the same direction, on almost the same plane, and on the same straight line against the linear sensors 20X and 20Y and the cylinder lenses 90X and 90Y.

Figure 12:
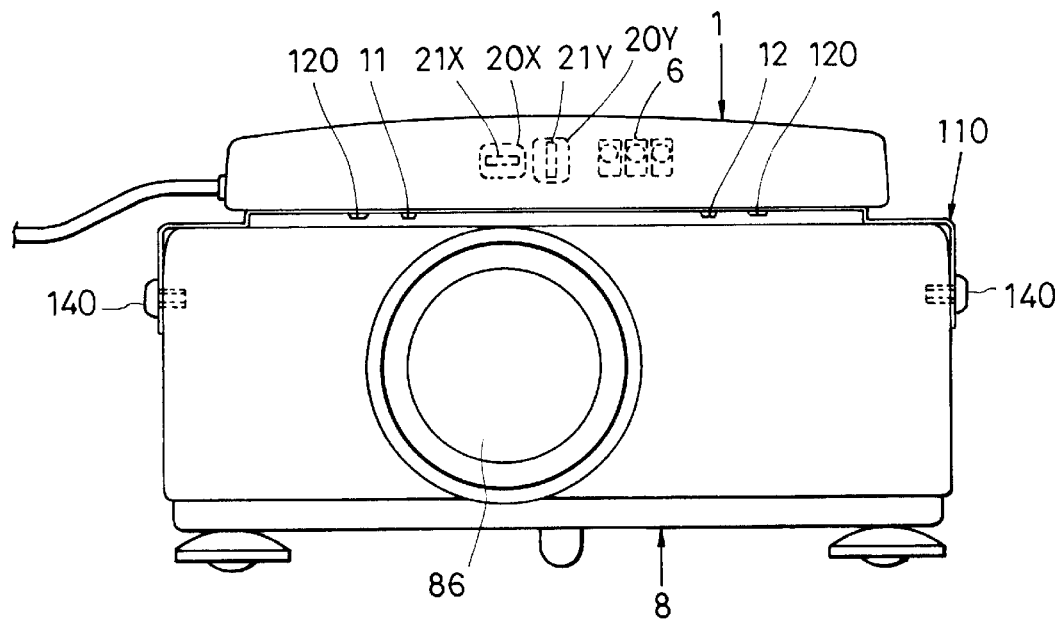
FIG. 12 is an elevation view of a projection-type display apparatus and a coordinate detector which are secured to each other according to the embodiment of the present invention.

The detector 1 will be described below by referring to FIG. 4. The detector 1 is placed on the projection-type display apparatus 8 (in an arrangement shown in FIG. 12, described later). The surface of the photosensitive section of each of the sensors 20X, 20Y, and 6 in the detector 1 is disposed in a plane perpendicular to the optical axis of the projection lens 86. The photosensitive section of the sensor 20X has a plurality of photosensitive areas arranged in line, and its longitudinal direction is parallel to the horizontal direction against the optical axis. The photosensitive section of the sensor 20Y has the same structure, and its longitudinal direction is parallel to the vertical direction against the optical axis (therefore, the sensors 20X and 20Y are arranged so as to be perpendicular to each other). At the forward side (screen side) of the sensors 20X and 20Y, the cylinder lenses 90X and 90Y are arranged horizontally and vertically according to the longitudinal directions of the sensors 20X and 20Y. When the sensors 20X and 20Y are disposed in the vicinity of the projection lens 86, parallax affects just a little. When the center of the photosensitive section of the sensor 20X matches the optical axis of the projection lens 86, for example, parallax in the X (horizontal) coordinates does not need to be compensated. The sensor 6 is disposed on the same plane (or on a plane parallel to the same plane) as the sensor 20X in the vicinity (at a side horizontally) of the sensors 20X and 20Y. The condenser lens 61 is disposed at the forward side (screen side) of the sensor 6. When the sensors are arranged on the same plane on a horizontal line as a unit, high precision and high space efficiency are obtained. The filter 100 is disposed at the forward side (screen side) of the cylinder lenses 90X and 90Y and the condenser lens 61 so as to cover the lenses. The front surface of the filter 100 is at the surface of the body of the detector 1. Therefore, light emitted from the pointer 4 is incident on the lenses 90X, 90Y, and 61 through the filter 100, condensed, and received by the sensors. In the above description, the detector 1 is placed on the projection-type display apparatus 8, as shown in FIG. 12. The detector 1 may be placed at a side of the projection-type display apparatus 8. Alternatively, the detector 1 may be disposed inside the projection-type display apparatus 8.

(Demodulation of a Control Signal)

Figure 6:
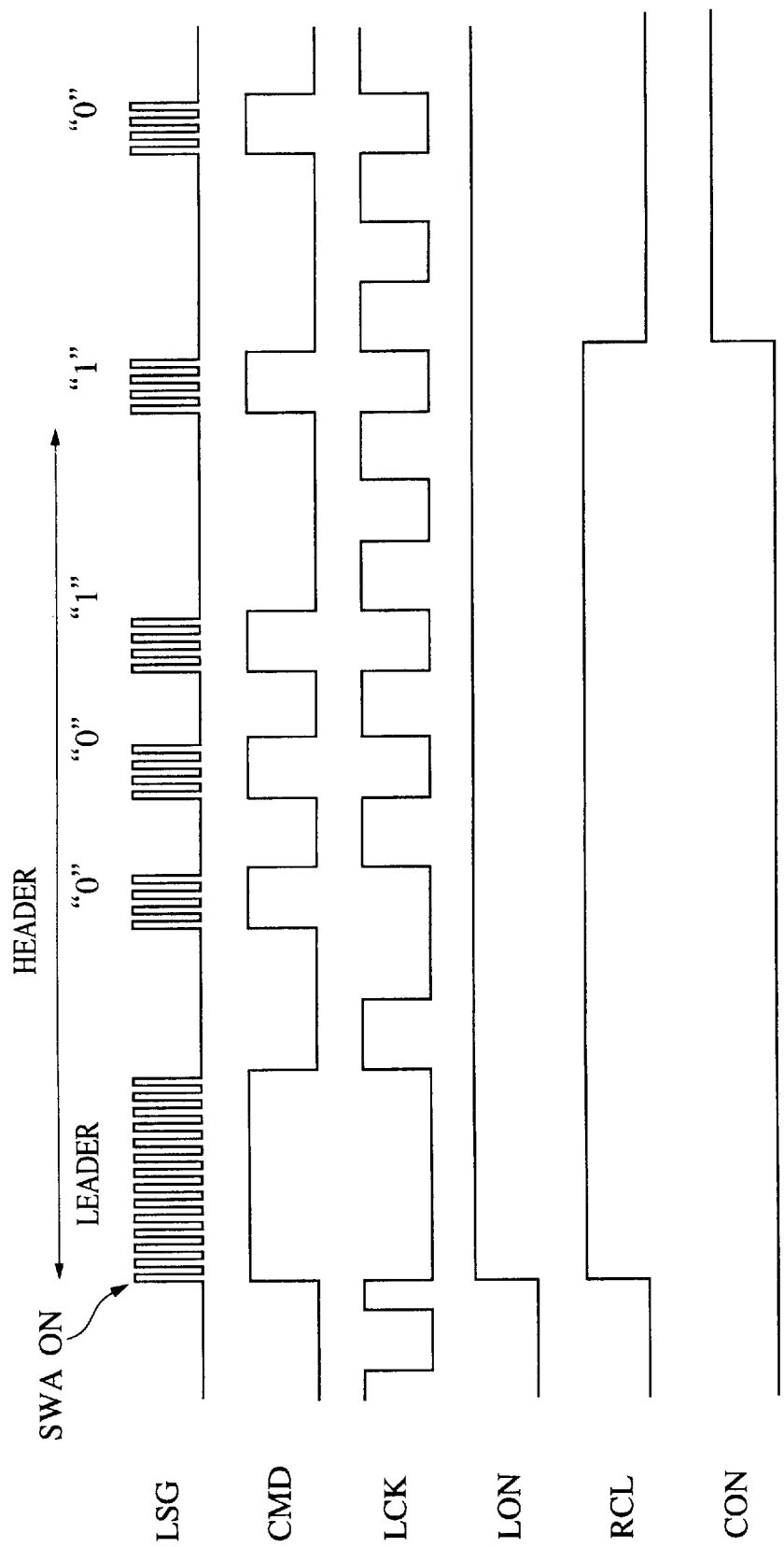
FIG. 6 is a timing chart of signals used for restoring a control signal sent from the control-signal detecting sensor according to the embodiment of the present invention.

FIG. 6 is a timing chart showing signal waveforms which indicate an operation for restoring a control signal from the output signal of the control-signal detecting sensor 6. As described above, when the switch 43 of the pointer 4 is set on, light starts being emitted. A header signal formed of a leader section having relatively long, continuous pulses and the following code (such as manufacturer ID) is first output, and then a transmission data sequence, such as a control signal, is output in an order and a format defined in advance.

Each data bit is modulated such that bit "0" has twice the interval of bit "1." The frequency detecting means 71 tunes in the period of pulses having a first frequency, which is highest among those of the waveform, and demodulates a modulated signal as a waveform CMD without receiving the effect of disturbance light by the use of the visible-Light-cut filter 100. The demodulated signal is interpreted as digital data by control-signal detecting means 72 and a control signal is restored. This structure is the same as that of infrared remote controllers widely used, and uses a highly reliable radio communication method. When the first modulation frequency is set to a higher band than that used for infrared remote controllers generally used, such as 60 kHz, if the optical coordinate input apparatus is used together with an infrared remote controller at the same time, a malfunction does not occur.

The detection output signal CMD of the frequency detecting means 71 is interpreted as digital data by the control-signal detecting means 72, and the control signal is restored and sent to communication control means 33.

The phase synchronization of the sensor will be described next.

The period used for code modulation, corresponding to a second frequency included in the waveform CMD is detected by the sensor control means 31 and used for sensor control.

More specifically, a signal LCK is generated, which is reset at the timing of the header section and is phase-synchronized with the next falling edge of the CMD signal. This means that the sensor control means 31 has a signal having a constant frequency, synchronized with whether light is emitted or not. A signal LON which indicates whether light is input or not is generated from the signal CMD, and a sensor-reset signal RCL which is activated by the signal LON is also generated. The two sensors are reset during the period when the signal RCL is high, and starts a synchronous integration operation, described later, at the falling timing of the signal RCL synchronized with a rising timing of the signal LCK. When the control-signal detecting means 72 detects a header and has confirmed that an input has started coming from the pointer 4, neither an input from other units nor noise, this condition is reported to the sensor control means 31, a signal CON indicating whether a sensor operation is effective is set high, and the operation of the coordinate calculation means 32 starts.

Figure 7:
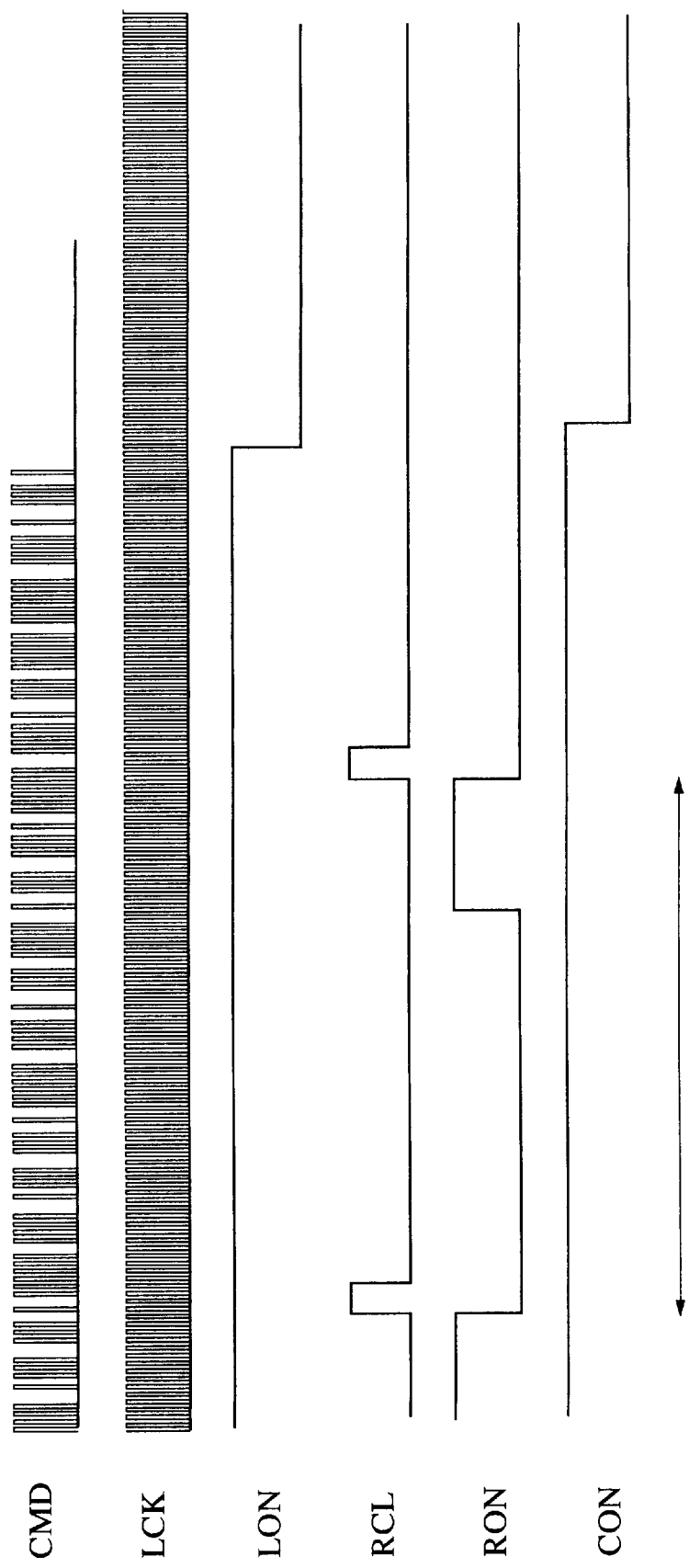
FIG. 7 is a timing chart showing the end of a series of operations for restoring a control signal from the output signal of a light-receiving device according to the embodiment of the present invention.

FIG. 7 is a timing chart showing the end of a series of operations after an optical input signal LSG disappears. When the demodulated signal CMD, detected from the signal LSG, continues to be low for a predetermined period of time, the signal LON, which indicates whether light is input or not, is set low, and the signal CON is also set low. The coordinate output operation is terminated.

Figure 8:
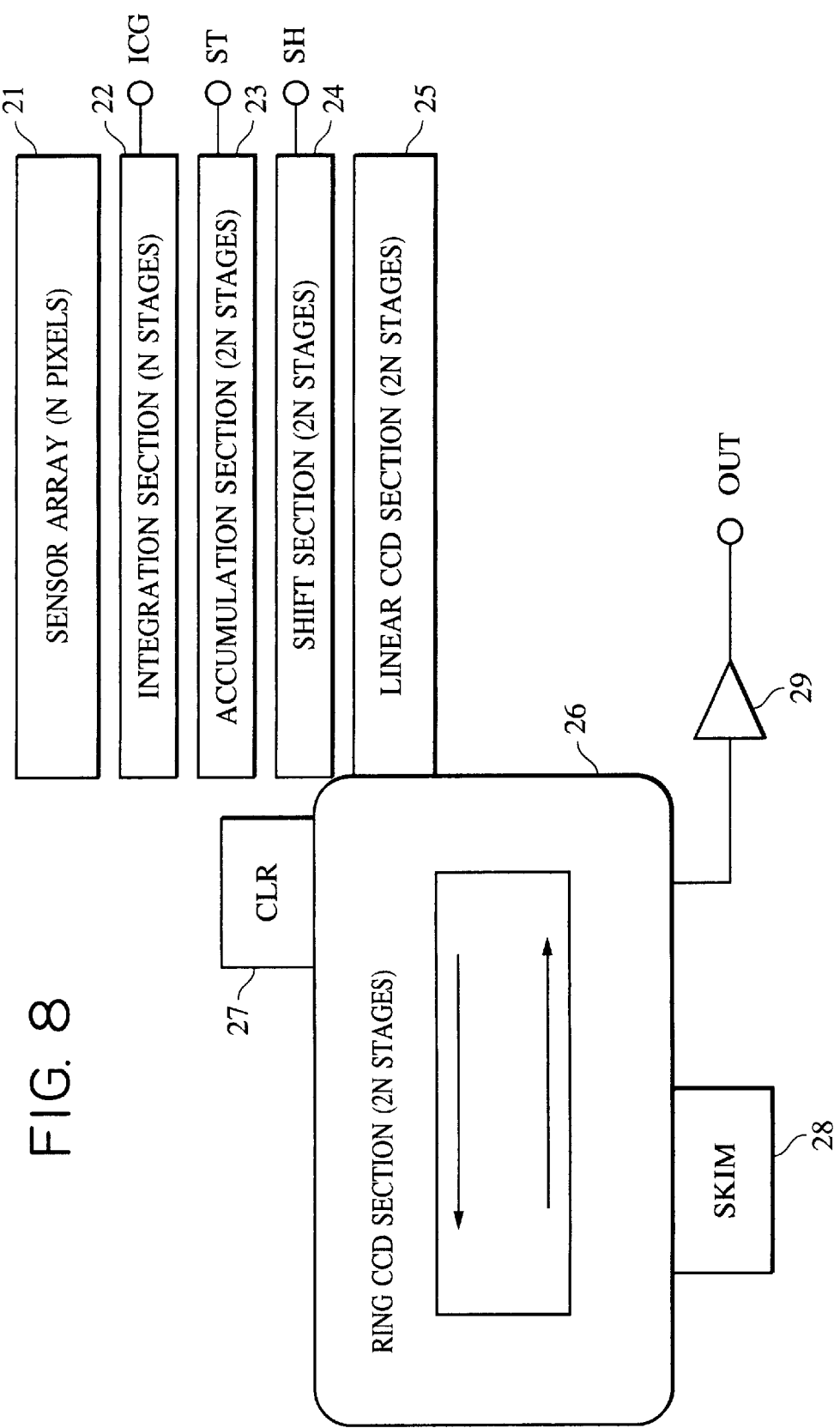
FIG. 8 is a view of the internal structure of the linear sensors according to the embodiment of the present invention.

The synchronous integration operation of the linear sensors will be described next. The sensors used in the present invention are of an array type and achieve a synchronous integration operation. FIG. 8 is an inside structural view of the sensors 20X and 20Y. Since details of the sensors are described in Japanese Unexamined Patent Application Publication No. Hei-08-233571 of the same assignee as for the present invention, only a portion related to the present invention will described below. Since the two sensors for the X coordinate and the Y coordinate are the same, only one of them will be described below. A sensor array 21 serving as a light receiving section is formed of N pixels. Charges corresponding to the amount of received light are accumulated by an integration section 22. Since the integration section 22 can be reset by applying a voltage to a gate ICG, an electrical shutter operation is possible. The charges accumulated in the integration section 22 are sent to an accumulation section 23 by applying a pulse voltage to an electrode ST. The accumulation section 23 has 2N stages, and accumulates charges separately for the high and low states of the signal LCK synchronized with the blinking of light. The accumulated charges are transferred to a 2N-stage linear CCD section 25 through a shift section provided for simplifying a transfer clock. In the linear CCD section 25, the charges corresponding to the blinking of the light, output from the N pixels are arranged adjacently. The charges arranged in the linear CCD section 25 are sequentially transferred to a ring CCD section 26. The ring CCD section 26 is reset to null by a CLR section 27 by the RCL signal described before, and then sequentially accumulates the charges sent from the linear CCD section 25. An amplifier 29 reads the charges, and outputs the voltage proportional to the amount of the accumulated charges in a non-destructive manner.

Figure 9:
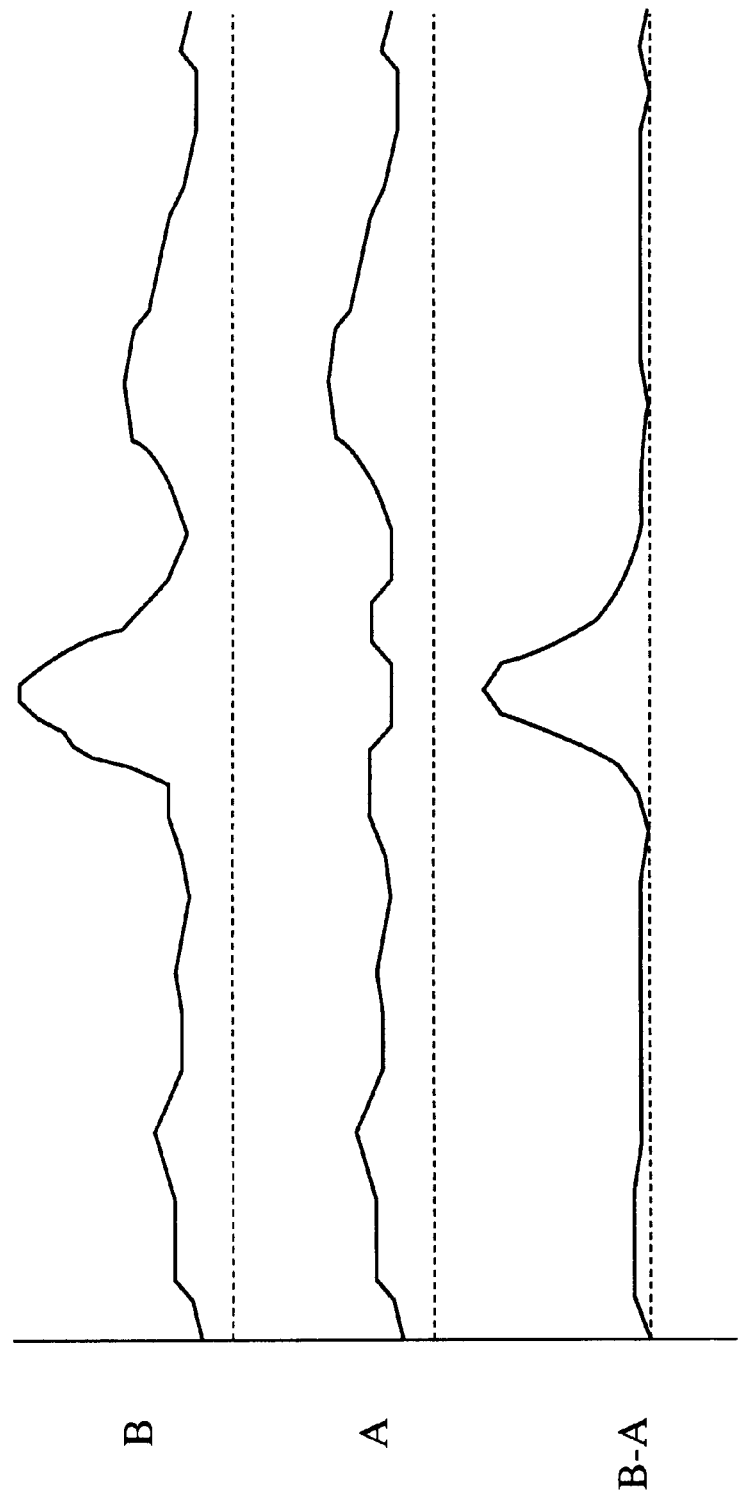
FIG. 9 is a view of example output waveforms of the linear sensors according to the embodiment of the present invention.

FIG. 9 is a view showing example output waveforms. A waveform B indicates a signal obtained when the light is turned on. A waveform A indicates a signal obtained when the light is turned off, namely, a signal of disturbance light only. Since the charges of the pixels corresponding to these waveforms are arranged adjacently in the ring CCD section 26, the amplifier 29 actually amplifies the difference between adjacent transfer stages in a non-destructive manner and outputs it. As shown by a waveform B-A, a disturbance-light component is canceled, noise is suppressed, and only the signal of the image formed of the blinking light sent from the pointer 4 is obtained in the output.

The above-described PEAK signal is the maximum value of the waveform, and is sequentially accumulated in the ring CCD section 26 and increases as blinking repeats. Therefore, when it is determined that the level of the signal reaches a predetermined value TH1, an output waveform having a constant quality is always obtained. This determination may be achieved separately for the two sensors for the X and Y coordinates. Since they are disposed very close, almost the same amounts of light are input to the sensors, and almost the same output peaks are obtained. Therefore, in the present embodiment, the determination is achieved for the output of only one of them, and the identical control is applied to both sensors to simplify the circuit.

Figure 10:
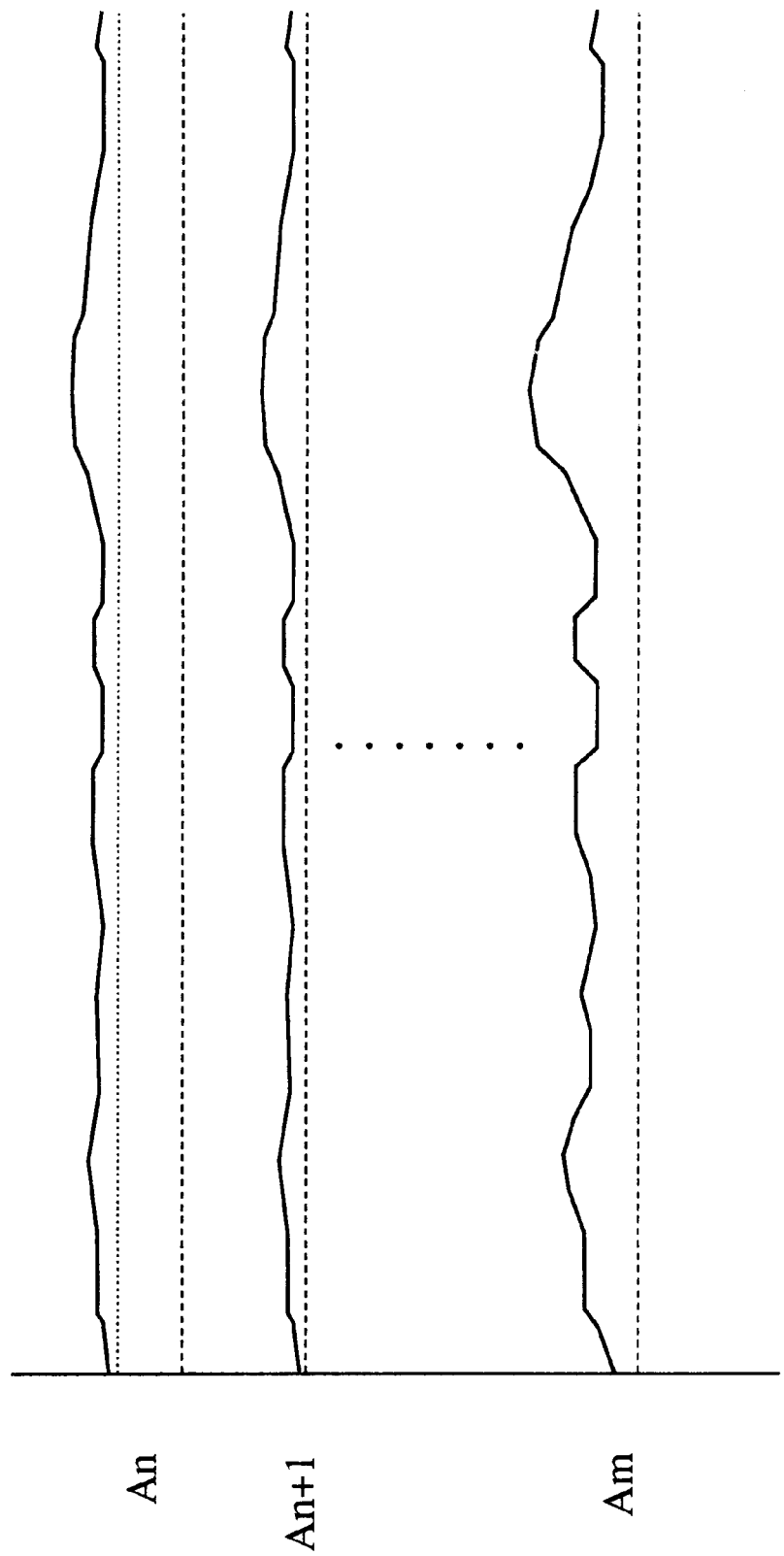
FIG. 10 is a view showing a skim operation of the linear sensors according to the embodiment of the present invention.

When disturbance light is very strong, the ring CCD section may be saturated with transfer charges before the peak of the difference waveform has a sufficient level. To avoid such a case, each of the sensors is provided with a skim function. FIG. 10 is a view showing the operation of the function. A skim section 28 monitors the level of a signal obtained when the light is turned off. When the signal level exceeds a predetermined value (indicated by a fine dotted line in the figure) at n-time transfer, the skim section 28 skims a predetermined amount of charges from each pixel. Therefore, the waveform becomes as shown by $A_{n+1}$ at (n+1) transfer. This operation is repeated in order that the ring CCD section 26 is not saturated with charges even if a very strong disturbance light is received, and signal-charge accumulation can continue. Consequently, it is possible to obtain a signal having a sufficient magnitude when integration operations continue a number of times even if the amount of blinking light is weak.

Figure 11:
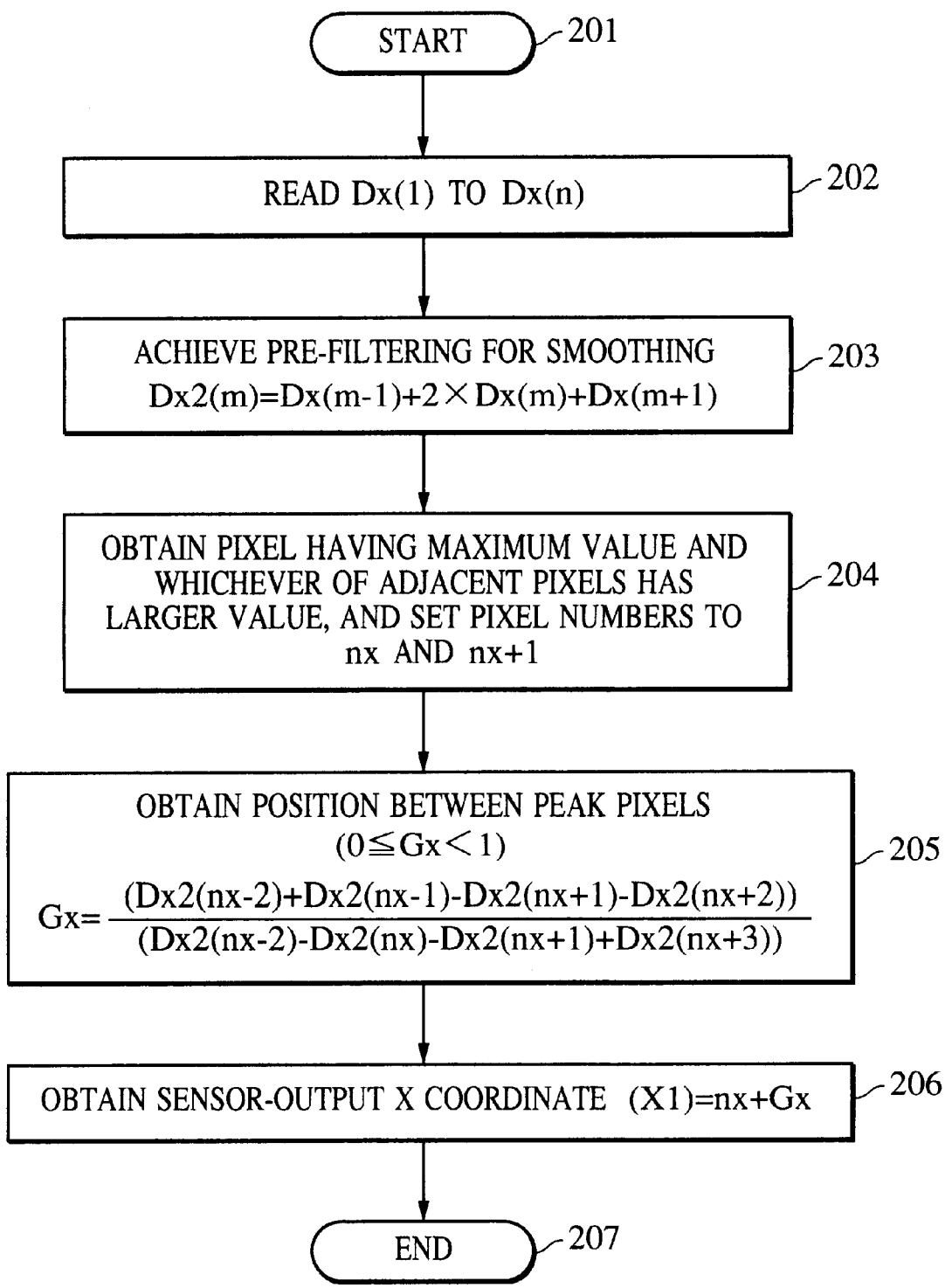
FIG. 11 is a flowchart of a coordinate calculation according to the embodiment of the present invention.

The signals (differential signals) obtained in this way from the two sensors are converted to digital signals by the A-D conversion means 31A having n bits (in the present embodiment, eight bits) provided for the sensor control means 31, and sent to the coordinate calculation means 32 for coordinate calculation. The coordinates (X1, Y1) on the sensors are obtained from the output data in the X and Y directions. Since the calculation is the same for the X and Y directions, a calculation flowchart for the X direction only is shown in FIG. 11.

In step S202, the differential data Dx(1) to Dx(N) of pixels is read and stored in a buffer memory. Then, in step S203, pre-filtering is achieved to further suppress noise to improve the s/n ratio. This is a simple addition well known as a vicinity calculation operator (1, 2, 1). Then, in step S204, the pixel having the maximum value and whichever of the adjacent pixels has a larger value are obtained and their pixel numbers are set to nx and nx+1. The accurate position between peak pixels is obtained by a kind (1, 1, 0, −1, −1) of differential operators. This calculation is for obtaining a zero crossing point of a differential waveform. The expression can be changed to a very simple form shown in step S205 by a simple manipulation. Gx is larger than −0.5 and is not larger than 0.5.

The sum of the coordinate Gx between the pixels obtained in this way and the pixel number nx is obtained as the sensor-output coordinate X1 in step S206.

In the same way as for X1, Y1 is obtained as the sum of Gy and ny.

Calibration is next achieved by using a user calibration function to obtain output coordinates (X, Y). The user calibration is a conversion achieved by a simple linear function. When the user specifies three (or more) points determined in advance, on the screen in a calibration-value setting mode, which is used, for example, in a case in which the installation condition is modified, the coefficients of the function are determined as the solutions of three simultaneous equations (a fitting method, such as the least squares method, is used when four or more points are specified). Since such an installation calibration method achieved by the user is generally used in coordinate input apparatuses and is not unique to the present invention, a detailed description thereof is omitted here. This is an inevitable function for apparatuses in which the installation is frequency changed, such as a front-projection-type projector according to the present embodiment.

The output coordinates (X, Y), obtained as described above, and data such as a control signal are sent to the computer 9 by the communication control means 33 in a predetermined communication method. By instructions sent from the computer 9, various types of operations, such as showing a cursor and a menu, and inputting letters and segment drawings, are performed on the screen on which the projection-type display apparatus 8 projects.

Figure 13:
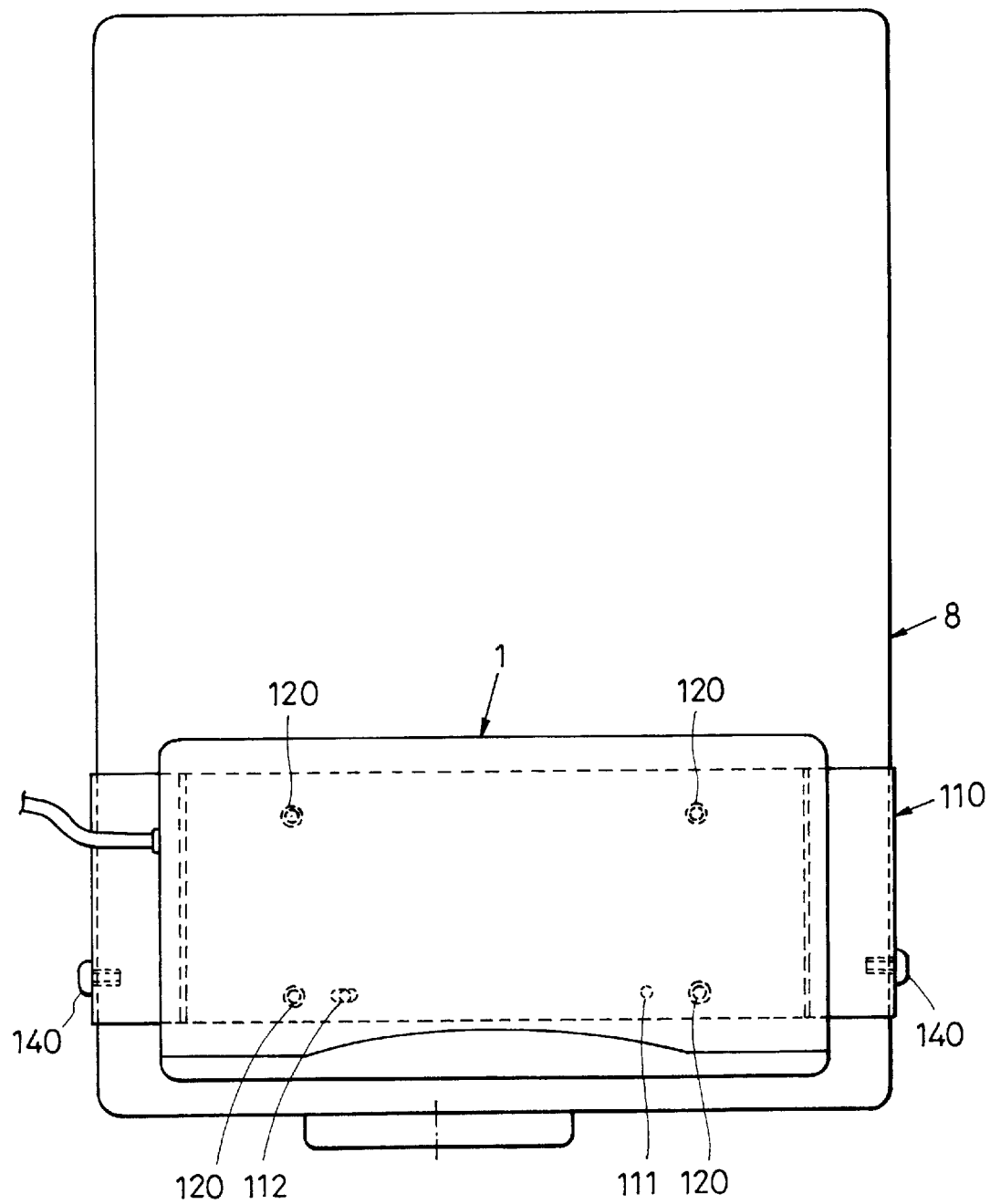
FIG. 13 is a top plan of the projection-type display apparatus and the coordinate detector which are secured to each other according to the embodiment of the present invention.

The structures of the projection-type display apparatus 8 and the detector 1 will be described next by referring to FIG. 12 and FIG. 13. FIG. 12 and FIG. 13 show the projection-type display apparatus 8 on which the coordinate detector 1 is secured through a secure plate 110. FIG. 12 is an elevation, and FIG. 13 is a plan.

The detector 1 is provided with positioning pins 11 and 12 at its bottom surface, which are fit in a hole 111 and an oblong hole 112 of the secure plate 110. The detector 1 is secured by screws 120. The secure plate 110 is secured to the projection-type display apparatus 8 by fittings 140.

As shown in FIG. 12, the linear sensor 20X built in the detector 1 is structured such that the photosensitive section 21X is positioned above the optical axis of the projection lens 86 of the projection-type display apparatus 8, the linear sensor 20Y and the photosensitive section 21Y are disposed in the vicinity of the linear sensor 20X and the photosensitive section 21X on almost the same plane, and the control-signal detecting sensor 6 is disposed in the vicinity of the linear sensors 20X and 20Y on almost the same plane.

To increase sensitivity, a plurality of the control-signal detecting sensors 6 may be disposed as shown in FIG. 12.

The detector 1 is secured to the projection-type display apparatus 8 by using the secure plate 110. It is also possible that the detector 1 is provided with the function of the secure plate 110 and the detector 1 is directly secured to the projection-type display apparatus 8.

As described above, since the signals of diffuse light which blinks at a predetermined period on the pointer 4, obtained when the light is turned on and when the light is turned off are separately integrated, and the difference signal therebetween is used, a disturbance-light component is offset. Therefore, the coordinate calculation means receives the signal of an optical spot image having a very high quality.

According to the present invention, a high-frequency carrier is added to blinking light, and amount-of-light detecting means controls the timing of the integration operation by the demodulated signal having a predetermined period, obtained by frequency-detecting the carrier. Therefore, the pointer and a pickup section are made synchronous without a cord. The user can input coordinates, control a connected computer, and write letters and drawings by pointing or manipulating a pointer serving as light emitting means, at a corresponding position on the screen during a presentation in a natural manner. This is convenient for the user.

Since the positioning of the sensors of the detector against the projection-type display apparatus is achieved by the simple secure method, the positional relationship between the pointer and the screen is correctly obtained.

As described above, according to the present invention, the accurate position of diffuse light emitted from the light emitting means is detected. By offsetting a disturbance-light component, the signal of an optical spot image having a very high quality is input. In addition, since the positioning of the sensors of the detector against the projection-type display apparatus is achieved by the simple secure method, the positional relationship between the pointer and the screen is correctly obtained.

The structure of the pointer 4 will be described in detail by referring to FIG. 14, FIG. 15, and FIG. 16.

Figure 14:
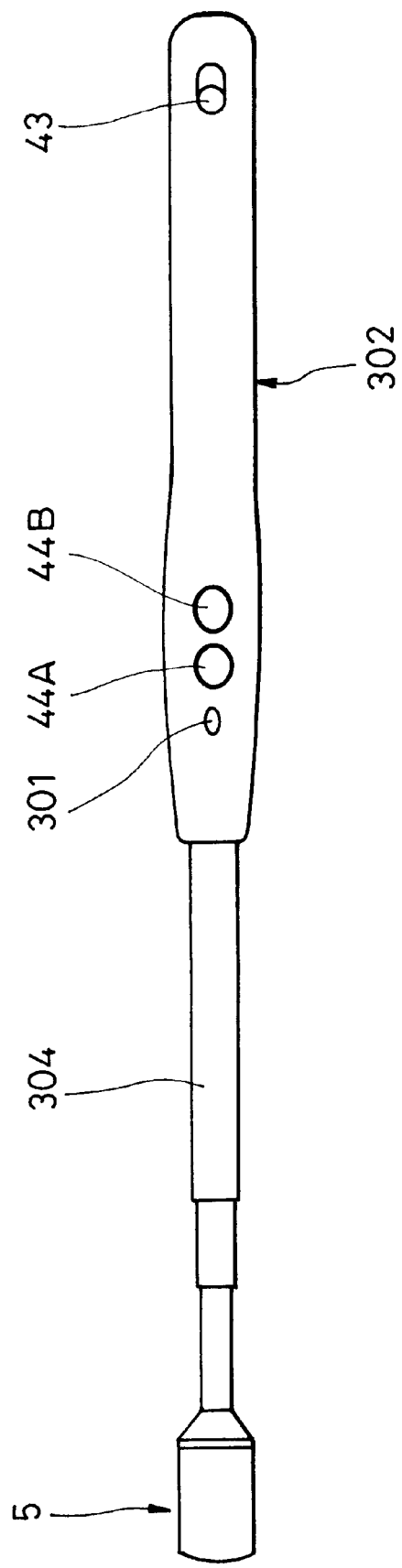
FIG. 14 is a plan of a pointer, showing the appearance thereof.
Figure 15:
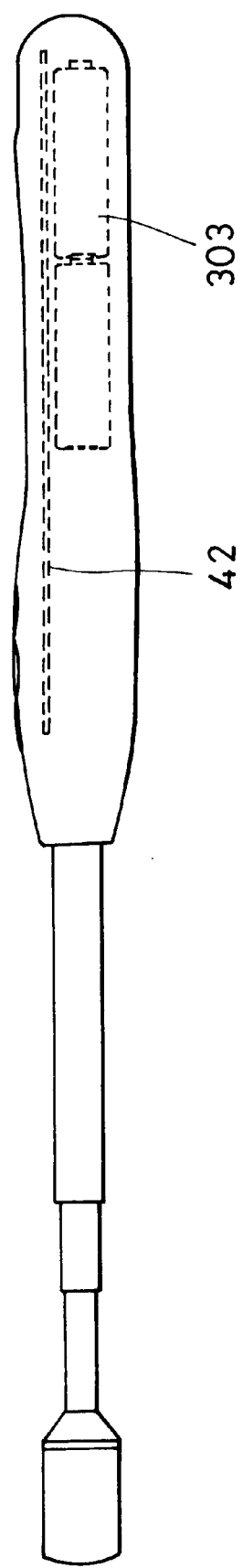
FIG. 15 is a side view of the pointer, showing the appearance thereof.

FIG. 14 and FIG. 15 are exterior views of the pointer 4. FIG. 14 is a view from the top, and FIG. 15 is a view from a side. FIG. 16 is a view showing the inside of the light emitting section 5. The same symbols as those used before are assigned to portions having the same functions as described above.

The pointer 4 is formed of the light emitting section 5, where the infrared LED 41 serving as a diffuse light source is built in a case 52, the light-emission control means 42 for controlling the emission of light, the switch 43, the buttons 44A and 44B, a display section 301 for displaying the on or off state of the switch, a battery 303, an external rod 304 and an internal rod 306 both for elastically connecting the light emitting section 5 to a grip section 302 while maintaining electric continuity, a wire 308 for electrically connecting the external rod 304 to the cathode of the infrared LED 41, a wire 309 for electrically connecting the internal rod 306 to the anode of the infrared LED 41, and a spacer 307 which is an electric insulator for connecting the external rod 304 to the internal rod 306.

In the grip section 302, the buttons 44A and 44B are disposed near the light emitting section 5 and the switch 43 is disposed far from the light emitting section 5. The display section 301 is disposed closer to the light emitting section 5 than the buttons 44A and 44B. With these arrangements, the user can manipulate the pointer 4 such that the grip section 302 is held by one hand; the buttons 44A and 44B are operated by a finger of the same hand; the switch is operated by a finger of another hand; and the display section 301 is seen while the grip section 302 is being held.

The external rod 304 and the internal rod 306 are electrically connected to the light-emission control means 42. At the infrared LED 41, light-emission control is achieved through the light-emission control means 42 according to the states of the switch 43 and the buttons 44A and 44B. The light-emission control includes whether the light is turned on or off and whether a control signal is superposed by the above-described modulation method.

Figure 16:
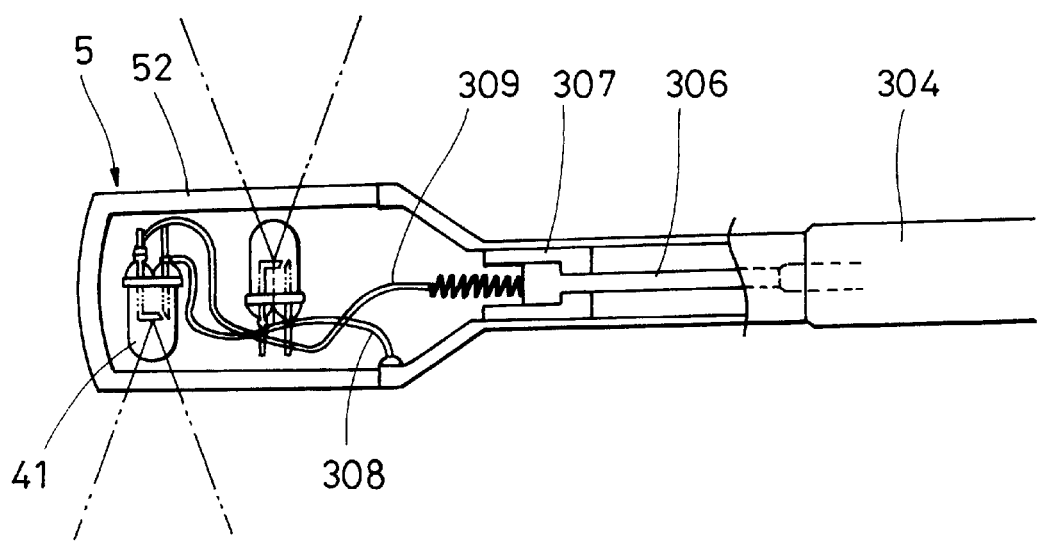
FIG. 16 a view showing the inside of a light emitting section.

As shown in FIG. 16, the infrared LED 41 is directed in a direction almost perpendicular to the direction in which the rods expand and contract so that it is convenient for the user of the pointer 4 to emit diffuse light toward the detector when standing near the screen and operating the pointer 4. A plurality of infrared LEDs 41 may be disposed according to their directivities and outputs. In addition, according to the characteristics of the infrared LED 41, the cover 52 may be made from a material which blocks visible light or a material having a high diffuse effect.

Figure 17:
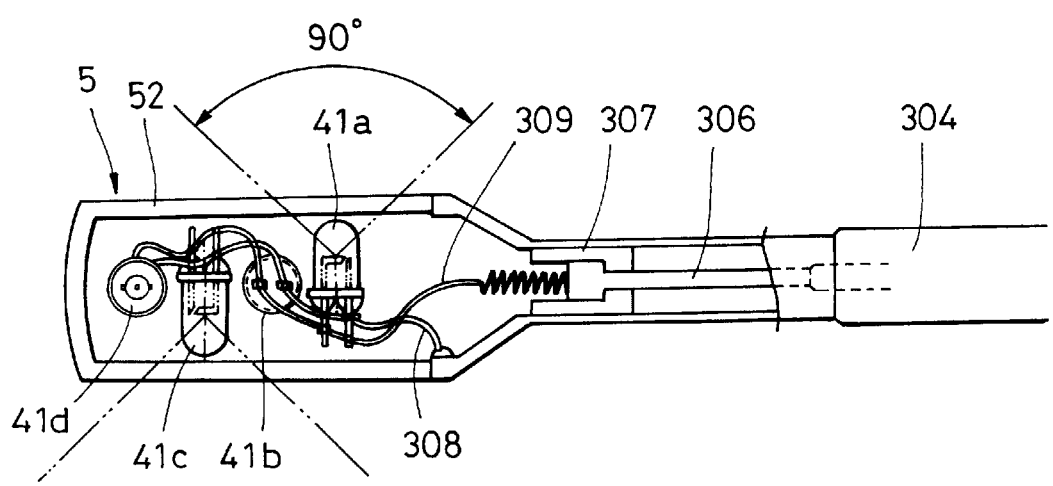
FIG. 17 is a view showing the internal structure of the light emitting section with a plurality of LEDs being disposed therein.

FIG. 17 shows a case in which a plurality of infrared LEDs are disposed.

Infrared LEDs 41a, 41b, 41c, and 41d have the identical characteristics, and their directivity area is 90 degrees if the required relative light-emission strength is 0.25. In this case, as shown in FIG. 17, they are disposed in directions almost perpendicular to the direction in which the rods expand and contract, with each of the directions being apart from an adjacent one by 90 degrees. With these arrangements, since the total directivity about the shaft of the rods becomes 360 degrees, the user does not need to pay attention to the directivity of the pointer when standing near the screen and operating the pointer. It is convenient for the user that diffuse light is always emitted toward the detector.

Figure 18:
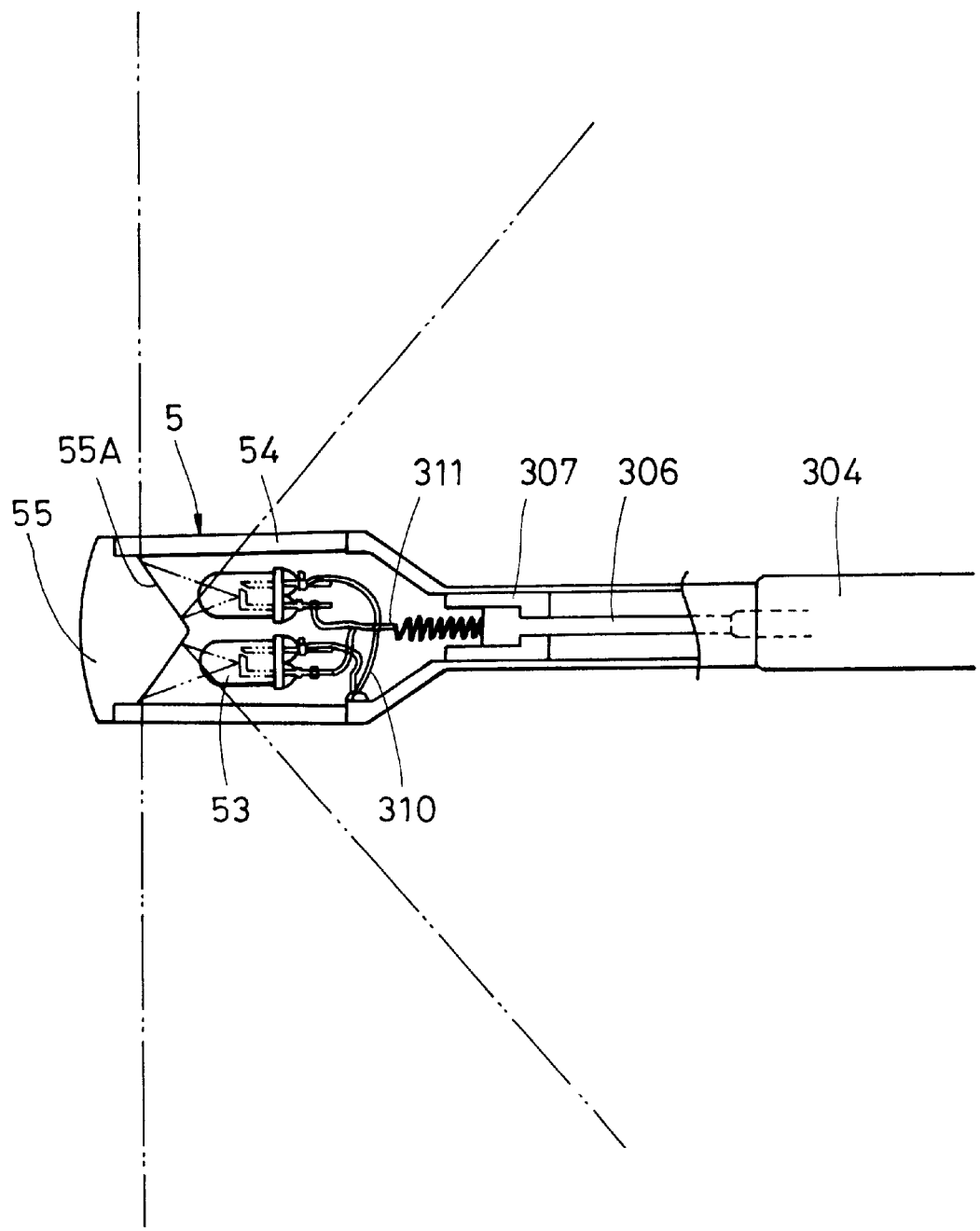
FIG. 18 is a view showing another internal structure of the light emitting section 5.

FIG. 18 is a view showing the inside of the light emitting section 5 which has a different structure from those shown in FIG. 16 and FIG. 17. The same symbols as those used above are assigned to portions having the same functions as those described above.

The light emitting section 5 includes a case 54 having a reflective member 55, in which an infrared LED 53 serving as a diffuse light source is built; a wire 310 for electrically connecting the external rod 304 to the cathode of the infrared LED 53; a wire 311 for electrically connecting the internal rod 306 to the anode of the infrared LED 53; and a spacer 307 which is an electrical insulator for connecting the external rod 304 to the internal rod 306. The external rod 304 and the internal rod 306 are electrically connected to the light-emission control means 42. Light-emission control which includes whether the light is turned on or off and whether a control signal is superposed by the above-described modulation method is applied to the infrared LED 53 according to the states of the switch 42 and the buttons 44A and 44B through the light-emission control means 42.

As shown in FIG. 18, the infrared LED 53 is disposed so as to be directed in the same direction as that in which the rods expand and contract, and the diffuse light emitted from the infrared LED 53 is reflected by a reflection plane 55A of the reflective member 55 in directions almost perpendicular to the rods. Therefore, it is convenient for the user of the pointer to emit the diffuse light toward the detector when standing by the screen and operating the pointer. A plurality of the infrared LEDs 53 may be disposed according to their directivities and outputs. In addition, according to the characteristics of the infrared LED 53, the cover 54 may be made from a material which blocks visible light or a material having a high diffuse effect.

As described above, since the signals of diffuse light which blinks at a predetermined period on the pointer 4, obtained when the light is turned on and when the light is turned off are separately integrated, and the difference signal therebetween is used, a disturbance-light component is offset. Therefore, the coordinate calculation means receives the signal of an optical spot image having a very high quality.

A high-frequency carrier is added to blinking light, and the amount-of-light detecting means controls the timing of the integration operation by the demodulated signal having a predetermined period, obtained by frequency-detecting the carrier. Therefore, the pointer and a pickup section are made synchronous without a cord. The user can input coordinates, control a connected computer, and write letters and drawings by pointing or manipulating a pointer serving as light emitting means, at a corresponding position on the screen during a presentation in a natural manner. This is convenient for the user.

It is also convenient that the distance between the light emitting section and the grip section of the pointer can be changed by the elastic rods according to the size of a screen and the form of presentation.

Since the switch and the button display section are disposed appropriately against the grip section, they are easy to operate and easy to view.

As described above, according to a coordinate input apparatus of the present invention, since the distance between the light emitting section and the grip section can be elastically changed according to the size of a screen and the form of presentation, the pointer provides very high operability.

Since the holding means for holding the light-emission state and the operation section of the light-emission control means are disposed at the most appropriate positions against the grip section, a coordinate input apparatus having a high operability and a high visibility is provided.

Since the distance between the light emitting section and the grip section can be elastically changed according to the size of a screen and the form of presentation, and the switch, the buttons, and the display section are disposed at the most appropriate positions, a coordinate input apparatus having a high operability and a high visibility is provided.

An object of the present invention is of course achieved by sending a storage medium which stores the program code of software which implements the functions of the above-described embodiment to a system or to an apparatus and by reading and executing the program code stored in the storage means by a computer (or CPU or MPU) of the system or the apparatus.

In this case, since the program code itself read from the storage medium implements the functions of the above-described embodiment, the storage medium which stores the program code is one aspect of the present invention.

As storage media for storing the program code, floppy disks, hard disks, optical disks, magneto-optical disks, CD-ROMs, CD-Rs, magnetic tapes, non-volatile memory cards, and ROMs can be used.

The present invention includes not only a case in which the functions of the above-described embodiment are implemented by executing the program code read by a computer but also a case in which an operating system (OS) running on the computer achieves the whole or a part of actual processing according to the instructions of the program code and the functions of the above-described embodiment are implemented by the processing.

Furthermore, the present invention includes a case in which the program code read from a storage medium is written into a memory provided for a function extension board inserted into the computer or provided for a function extension unit connected to the computer, the CPU provided for the function extension board or the function extension unit achieves the whole or a part of actual processing, and the functions of the above-described embodiment are implemented by the processing.

While the present invention has been described with reference to what are presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A coordinate input apparatus comprising:

first light-collecting means for directly collecting diffuse light emitted by a pointer in a projection optical path;

first detecting means for detecting a control signal of the diffuse light based on light collected by said first light-collecting means;

second light-collecting means for directly collecting diffuse light emitted by the pointer in the projection optical path; and second detecting means, which is independent of said first detecting means, for detecting positional information of the diffuse light based on light collected by said second light-collecting means.

2. A coordinate input apparatus according to claim 1, wherein said first light-collecting means and said second light-collecting means are directed in the same direction.

3. A coordinate input apparatus according to claim 1, wherein said first light-collecting means and said second light-collecting means are on the same plane.

4. A coordinate input apparatus according to claim 1, wherein said first light-collecting means and said second light-collecting means are on a straight line.

5. A coordinate input apparatus according to claim 1, wherein said second detecting means includes an X-coordinate light-collecting section and a Y-coordinate light-collecting section as a unit.

6. A coordinate input apparatus according to claim 1, wherein said first detecting means includes a plurality of photodiodes.

7. A coordinate input apparatus according to claim 1, further comprising a visible-light-cut filter disposed in the projection optical path to receive the diffuse light before said first detecting means and said second detecting means.

8. A coordinate input apparatus according to claim 1, wherein said second detecting means comprises a cylinder lens.

9. A coordinate input apparatus according to claim 1, wherein said generating means comprises a charge-coupled device.

10. A coordinate input apparatus according to claim 1, further comprising a pointer, said pointer including:

light emitting means for emitting diffuse light;

holding means for holding the light emission state of the diffuse light emitted by said light emitting means;

light-emission control means for controlling the light emission of said light emitting means; and a grip, wherein an operation section of said light-emission control means is disposed close to a top of said grip, and said holding means is disposed close to a bottom of said grip.

11. A coordinate input apparatus according to claim 10, wherein a power-supply display section used by said holding means to indicate the light emitting state of the diffuse light is disposed closer to the top of said grip than said light-emission control means.

12. A coordinate input apparatus according to claim 10, wherein said light emitting means is disposed at a tip of an elastic rod.

13. A coordinate input apparatus according to claim 12, wherein said elastic rod is made from an electrically conductive material.

14. A coordinate input apparatus according to claim 12, wherein said elastic rod has a double structure.

15. A coordinate input apparatus according to claim 10, wherein said light emitting means includes an extendable rod and has at least one light emitting element disposed so as to emit the diffuse light in a direction substantially perpendicular to a direction in which said rod extends.

16. A coordinate input apparatus according to claim 10, wherein said light emitting means includes an extendable rod and has at least one light emitting element disposed in a direction substantially identical with a direction in which said rod extends, said light emitting means also including reflective means for reflecting the diffuse light in a direction substantially perpendicular to a direction in which the rod extends.

17. A coordinate input apparatus according to claim 10, further comprising a light emitting element having a relative-light-emission strength of 0.25 in a directivity area of "a" degrees, with said light emitting means including 360/"a" light emitting elements or more.

18. A coordinate input apparatus according to claim 1, further comprising controlling means for controlling said second detecting means based on the control signal, which is detected by said first detecting means.

19. A coordinate input system comprising:

projection means for projecting an image;

a pointer emitting diffuse light of a predetermined wavelength;

first light-collecting means for directly collecting diffuse light emitted by the pointer in a projection optical path;

first detecting means for detecting a control signal of the diffuse light based on light collected by said first light-collecting means;

second light-collecting means for directly collecting diffuse light emitted by the pointer in the protection optical path; and second detecting means, which is independent of said first detecting means, for detecting positional information of the diffuse light based on light collected by said second light-collecting means.

20. A coordinate input system according to claim 19, further comprising control means for controlling an image projected on a projection plane according to the results achieved by said first and second detecting means and the positional information generated by said generating means.

21. A coordinate input system according to claim 19, wherein said first light-collecting means and said second light-collecting means are directed in the same direction.

22. A coordinate input system according to claim 19, wherein said first light-collecting means and said second light-collecting means are on the same plane.

23. A coordinate input system according to claim 19, wherein said first light-collecting means and said second light-collecting means are on a straight line.

24. A coordinate input system according to claim 19, wherein said second detecting means includes an X-coordinate light-collecting section and a Y-coordinate light-collecting section as a unit.

25. A coordinate input system according to claim 19, wherein said first detecting means includes a plurality of photodiodes.

26. A coordinate input system according to claim 19, further comprising a visible-light-cut filter disposed in a projection optical path to receive the diffuse light before said first and second detecting means.

27. A coordinate input system according to claim 19, wherein said second detecting means comprises a cylinder lens.

28. A coordinate input system according to claim 19, wherein said generating means comprises a charge-coupled device.

29. A coordinate input system according to claim 19, further comprising positioning means for positioning a coordinate detecting section comprising at least said second detecting means and said generating means, against a projection section comprising at least said projection means.

30. A coordinate input system according to claim 19, further comprising display means for displaying the image projected by said projection means.

31. A coordinate input system according to claim 19, wherein the diffuse light having the predetermined wavelength is infrared light.

32. A coordinate input system according to claim 19, wherein said pointer includes:
   light emitting means for emitting diffuse light;
   holding means for holding the light emission of said light emitting means; and
   light-emission control means for controlling the light emission of said light emitting means, said light-emission control means disposed in front of a grip and said holding means.

33. A coordinate input system according to claim 19, further comprising controlling means for controlling said second detecting means based on the control signal, which is detected by said first detecting means.

34. A coordinate input method comprising:
   a first light-collecting step of directly collecting diffuse light emitted by a pointer in a projection optical path;
   a first detecting step of detecting a control signal of the diffuse light by first detecting means based on light collected in said first light-collecting step;
   a second light-collecting step of directly collecting diffuse light emitted by the pointer in the projection optical path; and
   a second detecting step of detecting positional information of the diffuse light by second detecting means, which is independent of the first detecting means, based on light collected in said second light-collecting step.

35. A coordinate input method according to claim 34, further comprising a controlling step for controlling the second detecting means based on the control signal, which is detected in said first detecting step.

36. A coordinate input method comprising:
   a projecting step of projecting an image;
   an emitting step of emitting diffuse light of a predetermined wavelength by a pointer;
   a first light-collecting step of directly collecting diffuse light emitted at said emitting step in a projection optical path;
   a first detecting step of detecting a control signal of the diffuse light by first detecting means based on light collected in said first light-collecting step;
   a second light-collecting step of directly collecting diffuse light emitted in said emitting step in a projection optical path; and
   a second detecting step of detecting positional information of the diffuse light by second detecting means, which is independent of the first detecting means, based on light collected in said second light-collecting step.

37. A coordinate input method according to claim 36, further comprising the step of controlling an image projected on a projection plane according to the result of detection achieved in the detecting steps and the positional information generated in the generating step.

38. A coordinate input method according to claim 36, further comprising the step of displaying the image projected in the projection step.

39. A coordinate input method according to claim 36, wherein the diffuse light having the predetermined wavelength is infrared light.

40. A coordinate input method according to claim 36, further comprising a controlling step for controlling the second detecting means based on the control signal, which is detected in said first detecting step.

* * * * *